United States Patent [19]

Fernandez

[11] 3,851,661
[45] Dec. 3, 1974

[54] FLUID FLOW REGULATOR AND PRESSURE INDICATOR

[76] Inventor: John J. Fernandez, 1620 S. Myrtle Ave., Monrovia, Calif. 91016

[22] Filed: Feb. 14, 1973

[21] Appl. No.: 332,308

[52] U.S. Cl............ 137/558, 73/406, 123/139 AV, 138/30, 138/45, 417/540
[51] Int. Cl. ............................................. G11b 7/08
[58] Field of Search ........ 137/557, 568; 138/26, 30, 138/44, 45, 46; 123/139 AV; 73/406; 417/540

[56] References Cited
UNITED STATES PATENTS

| 69,894 | 10/1867 | Beardslee | 73/406 |
| 1,265,676 | 5/1918 | Klump | 73/406 |
| 2,852,033 | 9/1958 | Orser | 138/30 X |

Primary Examiner—Henry T. Klinksiek
Attorney, Agent, or Firm—Christie, Parker & Hale

[57] ABSTRACT

A fluid flow regulator and indicator device includes a housing connected between a source of fluid under pressure, such as a fuel pump, and a device to which fuel is supplied, such as a carburetor. The housing includes a pair of flexible diaphragms providing opposite movable walls of a sealed fluid flow passage through the housing. Separate biasing springs between each diaphragm and the housing adjust the position of the diaphragms in response to fluid flow through the passage to dampen fluid pulses entering the passage and provide a steady flow of fluid through the outlet of the passage. The biasing force of one spring is greater than that of the other spring, so that one diaphragm responds to a range of low fluid pressures existing in the system, and the other diaphragm responds to a range of high pressures in the system. Separate movable indicator arms connected to the diaphragms extend through opposite side walls of the housing. Each indicator arm responds to movement of its corresponding diaphragm and biasing spring to move away from the housing as fluid pressure in the passage increases to provide a reading of the fluid pressure in the system.

10 Claims, 3 Drawing Figures

PATENTED DEC 3 1974 3,851,661
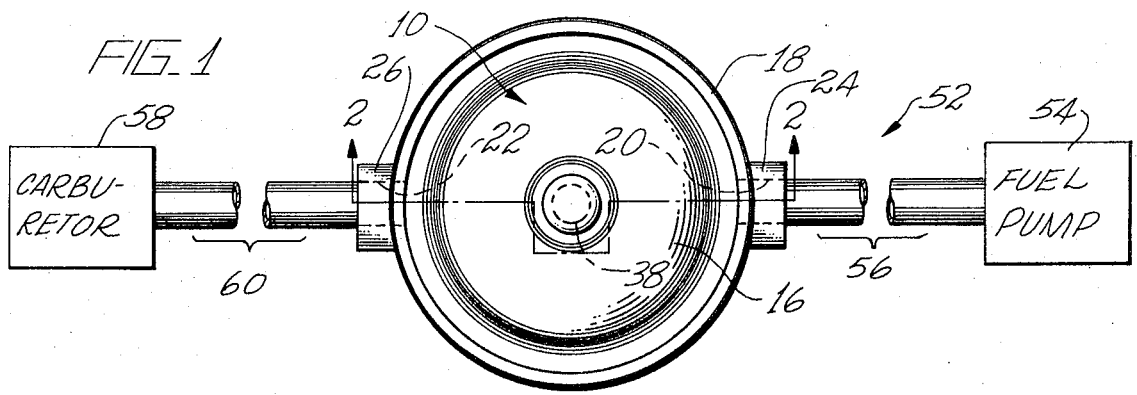
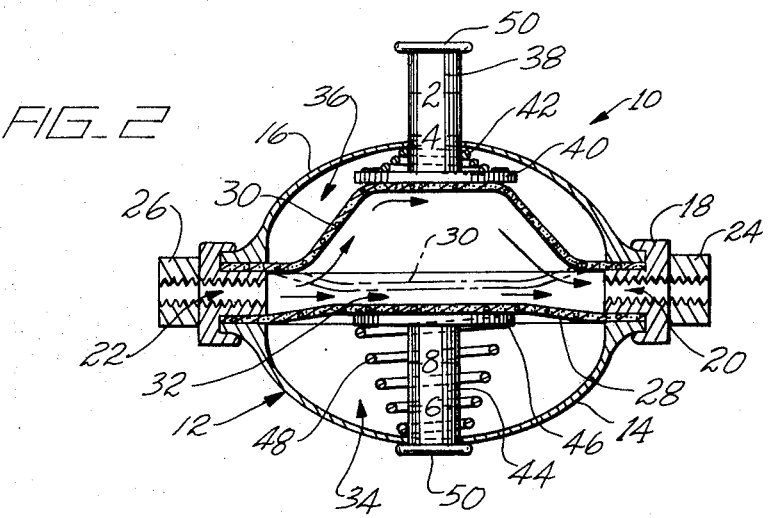

FLUID FLOW REGULATOR AND PRESSURE INDICATOR

BACKGROUND OF THE INVENTION

This invention relates to fluid regulators, and more particularly to a combined fluid flow regulator and pressure indicator. A preferred application of the invention is to regulate fuel flow from a fuel pump and also to measure and indicate the instantaneous fuel pressure in the fuel pump.

Generally speaking, fuel is fed to a carburetor of an engine from a fuel pump in a series of pulses, rather than in a continuous flow. In automobile engines, these pulsations can reduce engine performance by starving the carburetor momentarily when the driver turns, stops or starts, goes up or down hill, or suddenly accelerates.

Pulsating fuel delivered from the fuel pump also causes the carburetor float level to constantly vary during operation of the engine. This pulsating action reduces gasoline mileage. The pulsating gas flow also subjects the float to a continuous series of shocks, creating an undue amount of wear on the carburetor float and valve seat, which requires frequent overhaul of the carburetor.

There have been several prior art fuel flow regulators which can be connected to an engine fuel system to convert the pulsating flow of fuel from the engine fuel pump into a continuous flow to the carburetor. One such device is disclosed in my U.S. Pat. No. 2,899,975.

Generally speaking, a major drawback of previous fluid flow regulators has been their complicated structure and unreliability, which have made them too costly, in terms of initial cost and maintenance costs, to be attractive to the average consumer.

SUMMARY OF THE INVENTION

This invention provides a fluid flow regulator which can dampen fluid pulses from a source of fluid under pressure and convert the pulses into a steady flow. In a preferred use, the regulator can stop pulsations from a fuel pump and deliver a steady volume and pressure of gasoline to the engine carburetor. Thus, engine performance is improved, and the carburetor float is kept at a proper level, which improves gasoline mileage and reduces wear on the carburetor when compared with unregulated fuel flow to the carburetor.

Briefly, the fluid flow regulator of this invention includes a housing having a hollow interior, and an inlet and outlet to the hollow interior for connecting the regulator between a source of fluid under pressure and a device to which fluid is conducted. A flexible diaphragm in the housing provides a movable wall of a fluid flow passage for conducting fluid through the housing from the inlet to the outlet. Biasing means between the housing and the diaphragm adjust the position of the diaphragm in response to fluid flow through the passage to dampen fluid pulses entering the inlet and produce a steady fluid flow through the outlet.

When compared with previous fluid flow regulators, the regulator of this invention is relatively simple in construction, and therefore has good reliability and can be manufactured at a relatively lost cost. Moreover, the regulator is universal, because it can be installed in any direction (inlet and outlet are interchangeable) or angle relative to the components of a fluid supply system, without altering the performance of the system.

In a preferred form of the invention, the regulator includes a pair of laterally spaced apart opposed flexible diaphragms providing opposite walls of the fluid flow passage which conducts fluid through the housing. Each flexible diaphragm has its own biasing means for adjusting its position in response to fluid flow through the passage. The periphery of each diaphragm preferably is sealed to the housing to define a pair of opposed cavities in the hollow interior on opposite sides of the fluid flow passage. Each biasing means preferably is located in a corresponding cavity.

Preferably, the fluid flow regulator includes at least one indicator arm extending from a flexible diaphragm in the housing to the exterior of the housing. The indicator arm moves away from the exterior of the housing in response to increasing fluid pressure on the diaphragm in the passage. Indexing means on the indicator arm indicate the instantaneous amount of fluid pressure in the passage.

The indicator arm displays the amount of fuel pressure in the fuel pump or other source of fluid under pressure delivered to the regulator. Thus, the indicator arm provides an immediate indication of whether or not trouble is present in the fuel pressure supply source.

In a preferred form of the pressure indicator, separate indicator arms extend in opposite directions from opposed flexible diaphragms in the housing to the exterior of the housing. A biasing spring associated with one diaphragm and indicator arm has a greater biasing force than a second spring associated with the other diaphragm and indicator arm, so that one diaphragm responds to a range of low fluid pressures present in the system, and the other diaphragm responds to a range of high pressures covering the balance of the pressures present in the system. The two biasing springs provide good diaphragm response to the entire range of pressure existing in the system.

These and other aspects and advantages of the invention will be more fully understood by referring to the following detailed description and the accompanying drawing.

BRIEF DESCRIPTION OF THE DRAWING

FIG. 1 is a fragmentary, partly schematic, elevation view showing a fuel flow regulator and indicator device according to this invention connected between a fuel pump and a carburetor;

FIG. 2 is a sectional elevational view taken on line 2—2 of FIG. 1; and

FIG. 3 is a schematic elevation view showing the fuel pressure regulator and indicator in a position indicating maximum pressure being present in the system to which the regulator is connected.

DETAILED DESCRIPTION OF THE PREFERRED EMBODIMENT

Referring to the drawing, a fluid flow regulator 10 includes a housing 12 having a hollow interior. Housing 12 includes a pair of spaced apart clam-shell halves or end pieces 14 and 16 press-fitted into an outer ring 18 to form a sealed body enclosing the hollow interior of the housing.

The opposite sides of ring 18 are bored out to form internally threaded, diametrically opposed openings 20 and 22. A nut 24 having an internally threaded opening the same size as opening 20 is rigidly secured to ring 18 so the opening through the nut is concentric with opening 20. An identical nut 26 is similarly secured to the opposite side of ring 18 in alignment with opening 22.

A pair of spaced apart movable diaphragms 28 and 30 are disposed in the hollow interior of housing 12. The diaphragms preferably are substantially circular pieces of gas-impermeable flexible material. The outer periphery of diaphragm 28 is clamped between the outer periphery of end piece 14 and one side of ring 18, and the outer periphery of diaphragm 30 is similarly clamped between end piece 16 and the opposite side of ring 18. The two diaphragms thus provide a sealed fluid flow passage 32 through the hollow interior between openings 20 and 22, a sealed cavity 34 between diaphragm 28 and end 14, and a second sealed cavity 36 between diaphragm 30 and end 16.

A cylindrical elongated indicator arm 38 is disposed centrally in cavity 36. The outer portion of the arm extends through end piece 16. The indicator arm has an enlarged base 40 which is biased into engagement with the central portion of diaphragm 30 by a biasing spring 42 disposed around indicator arm 38. The biasing spring is a tapered coil spring which tapers narrower away from base 40 of the indicator arm.

An identical cylindrical elongated indicator arm 44 is disposed centrally in cavity 34, with an outer portion of the arm extending through an opening in end piece 14. An enlarged base 46 of arm 44 is biased into contact with the central portion of diaphragm 28 by a tapered coil spring 48.

Each biasing spring in its normal condition (in which no fluid flow is present in passage 32) is in tension between the inner wall of its respective cavity and the base portion of its corresponding indicator arm. The springs force each diaphragm to assume the inwardly bowed position of diaphragm 28 shown in FIG. 2 during no-flow conditions. Each indicator arm has a corresponding exterior stop flange 50 on its outer end which engages the wall of the housing to limit inward extension of the diaphragms, during no-flow conditions, to the position of diaphragm 28 illustrated in FIG. 2.

The operation of the fluid flow regulator 10 during flow conditions is understood best in the context of its use in a fuel system 52 of an automobile, as illustrated in FIG. 1. The fuel system includes a conventional fuel pump 54, and a conduit 56 from the fuel pump connected with regulator opening 20, the latter serving as an inlet to the regulator. The fuel system also includes a conventional carburetor 58, and a conduit 60 from the carburetor connected with regulator opening 22, the latter serving as the outlet of the regulator. One feature of regulator 10 is its ability to be universally installed in any direction, or at any angle, to the fuel pump, carburetor, or even a split gas line of the fuel system. As illustrated best in FIG. 3, full-flow conditions can be obtained in either direction through the regulator, with either opening to the housing serving as the inlet or outlet of the regulator.

Fuel fed from fuel pump 54 enters the inlet of the regulator in a series of pulses. As the fluid is fed through regulator passage 32, the flexible diaphragms absorb the cyclical pressure pulses of the fuel from the pump. The springs associated with the diaphragms are compressed by the diaphragms as fluid pressure in the passage increases. Conversely, when fluid pressure drops, the diaphragms converge through the force of the springs. This action of the diaphragms dampens the pulsations from the pump, and produces a continuous flow through the outlet of the regulator.

Thus pulsations of fuel normally fed from the pump to the carburetor are stopped, which saves gasoline and improves engine performance. Moreover, an even float level is maintained in the carburetor, which improves the life of the carburetor float and valve seat.

Regulator 10 also provides means for indicating the fuel pump pressure at all times while the engine is operating. The biasing force of spring 48 is substantially greater than that of spring 42, which provides a "dual-action" system for damping fuel pressure pulses and concurrently providing an indication of fuel pump pressure. The biasing forces of the coil springs are chosen so that the diaphragms will respond to fluid pressures up to the maximum working pressure in the fuel system. Moreover, the difference in biasing forces allows one spring to respond to low pressures and the other spring to respond to high pressures up to the maximum pressure in the system. In the system shown in the drawing, the maximum fuel pressure developed by the fuel pump is 8 psi. The biasing force of spring 42 is preferably chosen so that diaphragm 30 will respond to pressures in the range of 0 to 4 psi, and the biasing force of spring 48 is chosen so that diaphragm 28 will respond to pressures in the range of 5 to 8 psi.

FIG. 2 shows the response of the diaphragms when fuel pump pressure is 4 psi. In this instance, diaphragm 28 remains in its no-flow position, because it responds only to pressures greater than 4 psi. Diaphragm 30 (shown in an exaggerated position) responds to the fuel pressure existing in passage 32 by moving from its initial position (shown in phantom lines in FIG. 2) and compressing spring 42 to its maximum extent (the springs actually can compress into a single plane) to widen flow passage 32. The outward movement of each diaphragm also causes its corresponding indicator arm to extend out from the housing by a distance proportional to the amount of travel of the diaphragm, this distance also being proportional to the amount of fuel pressure in passage 32.

Each indicator arm contains indexing marks which provide a reading of the instantaneous pressure existing in the system. Thus, in the illustration shown in FIG. 2, only indicator arm 38 projects out from the housing, and the arm projects out sufficiently, by following the travel of diaphragm 30, to indicate that 4 psi pressure is present in the fuel system. FIG. 3 illustrates the position of the diaphragms and the indicator arms when the fuel pump pressure is 8 psi.

The dual-action of the diaphragms provides good response to the entire range of pressures existing in the system, as well as accurate pressure readings throughout the pressure range dictated by the system.

Thus, the fuel regulator and indicator device indicates fuel pump pressure at all times while the engine is operating. A particular advantage of the device is its ability to indicate fuel pump trouble. That is, if the maximum pressure developed by the fuel pump is known, the instantaneous reading provided by the indicator arms will immediately tell the owner of the automobile whether his fuel pump is operating properly, is weak, or needs replacement.

A further advantage of the flow regulator is its ability to act as a fuel reservoir to provide fuel for the carburetor immediately when the engine is started. This can be a particular advantage for the engine after it stands idle for a substantial length of time.

The present invention has been described in the context of its use in a fuel system where the device is connected between a fuel pump and carburetor. However, the regulator can be used in any application where it is beneficial to steady the flow produced by a pulsating source of fluid under pressure.

I claim:

1. A fluid flow regulating device including a housing having a hollow interior, and an inlet and outlet to the hollow interior, the inlet being adapted for connection to source of fluid under pressure to be delivered to the interior of the housing, the outlet being adapted to conduct the fluid from the interior of the housing;

a pair of laterally spaced apart flexible diaphragms in the housing providing opposite movable walls of a fluid flow passage for conducting fluid through the housing from the inlet to the outlet;

separate biasing springs extending between the housing and each diaphragm to adjust the position of the respective diaphragms in response to fluid flow through the passage to dampen fluid pulses entering through the inlet and produce a substantially steady fluid flow through the outlet; and separate indicator arms extending in opposite directions from each diaphragm to the exterior of the housing, the indicator arms being movable away from the exterior of the housing by movement of their associated diaphragms in response to increasing fluid pressure in the passage, the indicator arms being movable away from the housing through a distance of travel proportional to the amount of fluid pressure in the passage to indicate the instantaneous amount of said fluid pressure, one biasing spring having a greater biasing force than the other biasing spring so that the travel of one indicator arm will provide an indication of lower fluid pressure levels than the travel of the other indicator arm.

2. Apparatus according to claim 1 including separate indexing means on each indicator arm to indicate the instantaneous amount of fluid pressure in the passage, the indexing means on one indicator arm providing a reading of lower fluid pressure levels than the indexing means of the other indicator arm.

3. Apparatus according to claim 2 in which the biasing force of one spring is of such value that it will produce a maximum scale reading on one indicator arm equal to a fraction of the maximum fluid pressure in the passage, and the biasing force of the other spring is of such value that it will produce a scale reading of the balance of the fluid pressure in the passage.

4. Apparatus according to claim 3 in which the biasing force of one spring will produce a maximum scale reading on the indicator arm of about one-half the maximum fluid pressure of the passage, and the other biasing spring will produce a maximum scale reading of the maximum fluid pressure of the passage.

5. Apparatus according to claim 1 in which each biasing spring is a tapered coil spring, and in which each indicator arm extends through its corresponding spring.

6. Apparatus according to claim 1 in which each diaphragm has its periphery sealed to the housing to define a pair of opposed cavities in the hollow interior on opposite sides of the fluid flow passage, each biasing spring being in a corresponding cavity and extending between its corresponding diaphragm and the inner wall of the cavity.

7. Apparatus according to claim 6 in which the biasing force of one spring is of such value that it will produce a maximum scale reading on one indicator arm equal to a fraction of the maximum fluid pressure in the passage, and the biasing force on the other spring is of such value that it will produce a scale reading of the balance of the fluid pressure in the passage.

8. Apparatus according to claim 6 in which each biasing spring is normally in tension between the inner wall of its respective cavity and its corresponding disphragm when there is an absence of fluid flow through the passage, the spring force of each tensioned biasing spring forcing the central portion of its corresponding diaphragm to be bowed inwardly to produce a fluid flow passage which tapers narrower toward the central portion of the passage.

9. Apparatus according to claim 1 in which each biasing spring is normally in tension between the inner wall of its respective cavity and its corresponding diaphragm when there is an absence of fluid flow through the passage, the spring force of each tensioned biasing spring forcing the central portion of its corresponding diaphragm to be bowed inwardly to produce a fluid flow passage which tapers narrower toward the central portion of the passage.

10. Apparatus according to claim 9 including separate indexing means on each indicator arm to indicate the instantaneous amount of fluid pressure in the passage, the indexing means on one indicator arm providing a reading of lower fluid pressure levels than the indexing means on the other indicator arm.

* * * * *